United States Patent
Wilk et al.

(10) Patent No.: US 7,344,064 B2
(45) Date of Patent: Mar. 18, 2008

(54) SYSTEM AND METHOD FOR PROCESSING ELECTRONICALLY DEPOSITED CHECKS

(75) Inventors: David B. Wilk, Clinton, CT (US); Jay Reichelsheimer, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 11/413,305

(22) Filed: Apr. 28, 2006

(65) Prior Publication Data

US 2007/0251991 A1 Nov. 1, 2007

(51) Int. Cl.
*G06F 17/60* (2006.01)
(52) U.S. Cl. .......................... 235/379; 705/44; 705/45; 382/137; 382/138; 382/139
(58) Field of Classification Search ................ 235/379; 382/137–139; 705/44, 45
See application file for complete search history.

(56) References Cited

U.S. PATENT DOCUMENTS 7,137,551 B1 * 11/2006 Crews et al. ............... 235/379

2007/0127805 A1 * 6/2007 Foth et al. .................. 382/137

* cited by examiner

*Primary Examiner*—Michael G. Lee
*Assistant Examiner*—Allyson N Trail
(74) *Attorney, Agent, or Firm*—George M. Macdonald; Angelo N. Chaclas

(57) ABSTRACT

A method of processing a check prior to electronically depositing the check includes receiving the check, determining a number of existing check submission indicating marks, if any, that are present on the check, determining whether the number is less than a pre-set maximum number, discontinuing the processing of the check if it is determined that the number is not less than the pre-set maximum number, and printing a new check submission indicating mark onto the check and continuing the processing of the check if it is determined that the number is less than the pre-set maximum number. The existing check submission indicating marks may be printed with an energy emitting ink, such as, without limitation, a luminescent ink. Also provided is an apparatus adapted to implement the method just described.

21 Claims, 4 Drawing Sheets

SYSTEM AND METHOD FOR PROCESSING ELECTRONICALLY DEPOSITED CHECKS

CROSS-REFERENCE TO RELATED APPLICATION

This application is related to application Ser. No. 11/413,458, entitled "System And Method For Canceling Electronically Deposited Checks" and filed contemporaneously herewith, which related application is incorporated herein by reference.

FIELD OF THE INVENTION

The present invention relates to check deposit systems, and in particular to a system and method for processing checks during a remote check image capture and deposit process wherein the checks may, if necessary, be resubmitted for processing no more than a predetermined number of times.

BACKGROUND OF THE INVENTION

Traditionally, businesses have deposited checks received from, for example, customers by physically taking the checks to a branch of their bank and depositing them over the counter with a teller or dropping them into a night deposit box. The actual physical presentation of checks to be deposited was necessary because, under prior banking laws, the depository bank had to present the original of each check to the corresponding paying bank in order to clear the check. This changed in October of 2004 with the enactment of The Check Clearing for the 21$^{st}$ Century Act, commonly referred to Check 21. Check 21 removed the legal requirement that an original paper check had to be presented to obtain payment. Instead, banks can now use digital images to transport check data from the bank of first deposit to the paying bank. If the paying bank cannot process a check image, the image can be printed, according to certain specifications, to create what is known as a substitute check, which is the legal equivalent of the original paper check. Check 21 has thus opened the door for remote check deposit solutions wherein check images, rather than original paper checks, are used to make deposits, thereby enabling businesses to eliminate trips to the bank. In addition, the use of check images also reduces check transportation costs among banks and improves funds availability.

In order to implement a remote check deposit solution, a depositor must have at their location a device that includes, at a minimum, a scanner and a secure network connection, such as a secure Internet connection. When the depositor wishes to make a deposit, an operator, such an accounts receivable clerk, scans each of the checks to be deposited and provides the dollar amount of each check, such as by keying the dollar amount into the device as each check is being scanned. Alternatively, the device may be provided with optical character recognition (OCR) software that is adapted to obtain the dollar amount of each check directly from the scanned image. In either case, once the images are created and the dollar amount of each check is obtained, that information is transmitted through the network (e.g., the Internet) either directly to the depository bank or to a third party service provider which in turn forwards the information on to the depository bank following some additional processing. Once the check images and corresponding information are received at the depository bank, they are used to make the appropriate deposits to the depositor's account.

While such systems add convenience for depositors and reduce the amount of, and thus the cost of, bank operator intervention, they do introduce the potential for fraud. For example, a depositor may attempt to deposit a single check multiple times by scanning and submitting it for deposit multiple times or by scanning it for electronic deposit and then subsequently attempting to redeposit it physically at a bank branch. Thus, the assignee of the present invention has developed a remote check capture system and method, described in co-pending application Ser. No. 11/413,458, entitled "System and Method for Canceling Electronically Deposited Checks", the disclosure of which is incorporated herein by reference, that reduces the risk of fraud from multiple attempts to deposit the same check by ensuring that the check is canceled before it is able to be submitted for electronic deposit. There are, however, circumstances, such as errors at the depository bank or at a third party service provider processing the checks, where it may be necessary to resubmit a previously submitted and previously canceled check. Letting this go unchecked, however, could expose the system to fraud. Thus, there is a need for a remote check capture system and method that monitors and limits the number of times that a particular check can be submitted for electronic deposit.

SUMMARY OF THE INVENTION

A method of processing a check prior to electronically depositing the check is provided wherein the number of times that the check can be submitted for processing is limited. The method includes the following steps: (a) receiving the check, (b) determining a number of existing check submission indicating marks, if any, that are present on the check, (c) determining whether the number is less than a pre-set maximum number, (d) discontinuing the processing of the check if it is determined that the number is not less than the pre-set maximum number, and (e) printing a new check submission indicating mark onto the check and continuing the processing of the check if it is determined that the number is less than the pre-set maximum number. In the preferred embodiment of the method, the existing check submission indicating marks, if any, are printed with an energy emitting ink, such as, without limitation, a luminescent ink (e.g., a fluorescent or phosphorescent ink). In this embodiment, the step of determining the number of existing check submission indicating marks includes (i) radiating first energy toward the check, (ii) receiving second energy, if any, emitted from the check as a result of the radiated first energy impinging upon the existing check submission indicating marks, if any, present on the check, and (iii) determining the number based upon the second energy or lack thereof. Also in this embodiment, the printing step includes printing the new check submission indicating mark with the energy emitting ink. In cases where the energy emitting ink is a luminescent ink, the first energy is UV energy. The method may also further include informing an operator that the processing of the check cannot continue if it is determined that the number of existing check submission indicating marks is not less than the pre-set maximum number. The check indicating marks may take the form of a vertical bar or any other suitable shape or form.

In one particular embodiment, the method further includes determining whether a proper cancellation marking is present on the check prior to the step of determining a number of existing check submission indicating marks, and printing a proper cancellation marking onto the check if it is determined that a proper cancellation marking is not present on the check. In this embodiment, steps (b) through (e) described above are preferably performed only if it is determined that a proper cancellation marking is present on the check. The proper cancellation marking that is printed onto the check may or may not include a first check submission indicating mark.

Also provided is an apparatus for electronically depositing a check that includes a controller, a scanner in electronic communication with the controller for generating an electronic image of the check, a print head in electronic communication with the controller which may, in one embodiment, print an energy emitting ink, such as a luminescent ink, onto the check, a sensor device in electronic communication with the controller, and a memory in electronic communication with the controller. The memory includes one or more routines that are executable by the controller. The routines include instructions for implementing the various embodiments of the method described above. Where appropriate, the sensor device may includes a radiant energy source, such as UV LED, for radiating first energy, such as UV radiation, toward the check and a photodetector for detecting the second energy, if any, that is radiating by the check.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
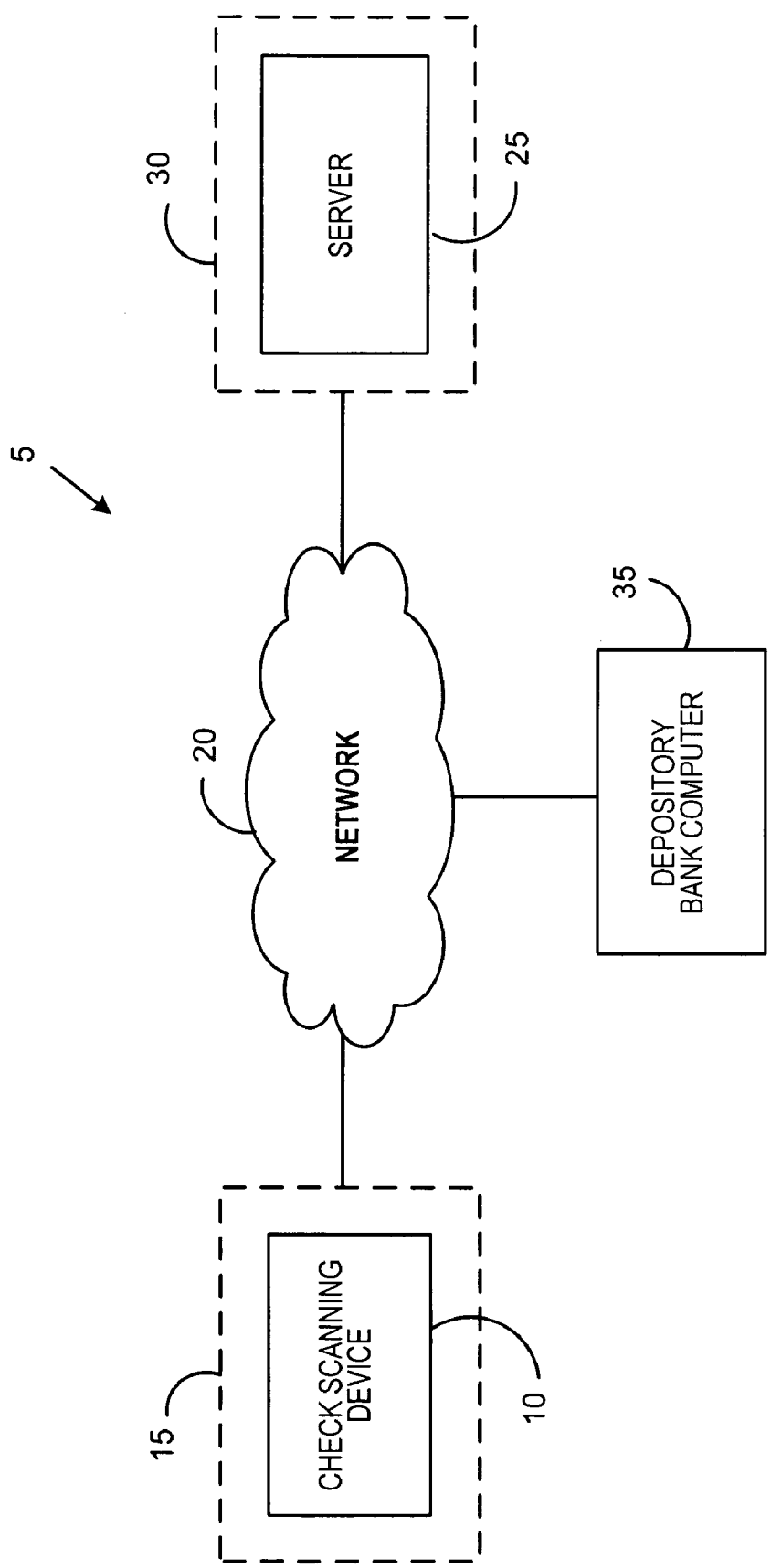
FIG. 1 is a block diagram of a remote check capture system according to an embodiment of the present invention.

FIG. 1 is a block diagram of a remote check capture system 5 according to an embodiment of the present invention. Remote check capture system 5 enables a depositor to remotely deposit a number of checks in a particular depository bank. Remote check capture system 5 includes a check scanning device 10 located at a depositor location 15 for scanning and thereby creating electronic images of the checks to be deposited. The check scanning device 10 is in secure electronic communication with a network 20, which may be, for example, the Internet, one or more private computer networks, or any combination thereof. Remote check capture system 5 further includes a server 25 located at a service provider location 30. The server 25 is also in secure electronic communication with the network 20. Finally, the remote check capture system 5 includes a depository bank computer 35, which is a computer designated by the depository bank to receive and process electronic deposit information. The service provider location 30 may be a facility operated by a third party service provider or a facility operated by the depository bank where the bank provides remote deposit services to its customers.

As described in further detail herein, a depositor feeds the checks to be deposited into the check scanning device 10, which in turn creates an image of each check. Those images, preferably also with dollar amount information either provided by the depositor or obtained automatically from the check images, are transmitted to the server 25 located at the service provider location 30 through the network 20. The role of the service provider operating the server 25 is to accumulate check images to be deposited and process them so that they can readily be sent to and deposited by the depository bank. Thus, the server 25 receives the images transmitted by the check scanning device 10, performs certain additional processing steps not relevant to the present description, and then forwards the images and associated information to the depository bank computer 35. Once the check images and corresponding information are received at by the depository bank computer 35 at the depository bank, they are used to make the appropriate deposits to the depositor's account.

Figure 2:
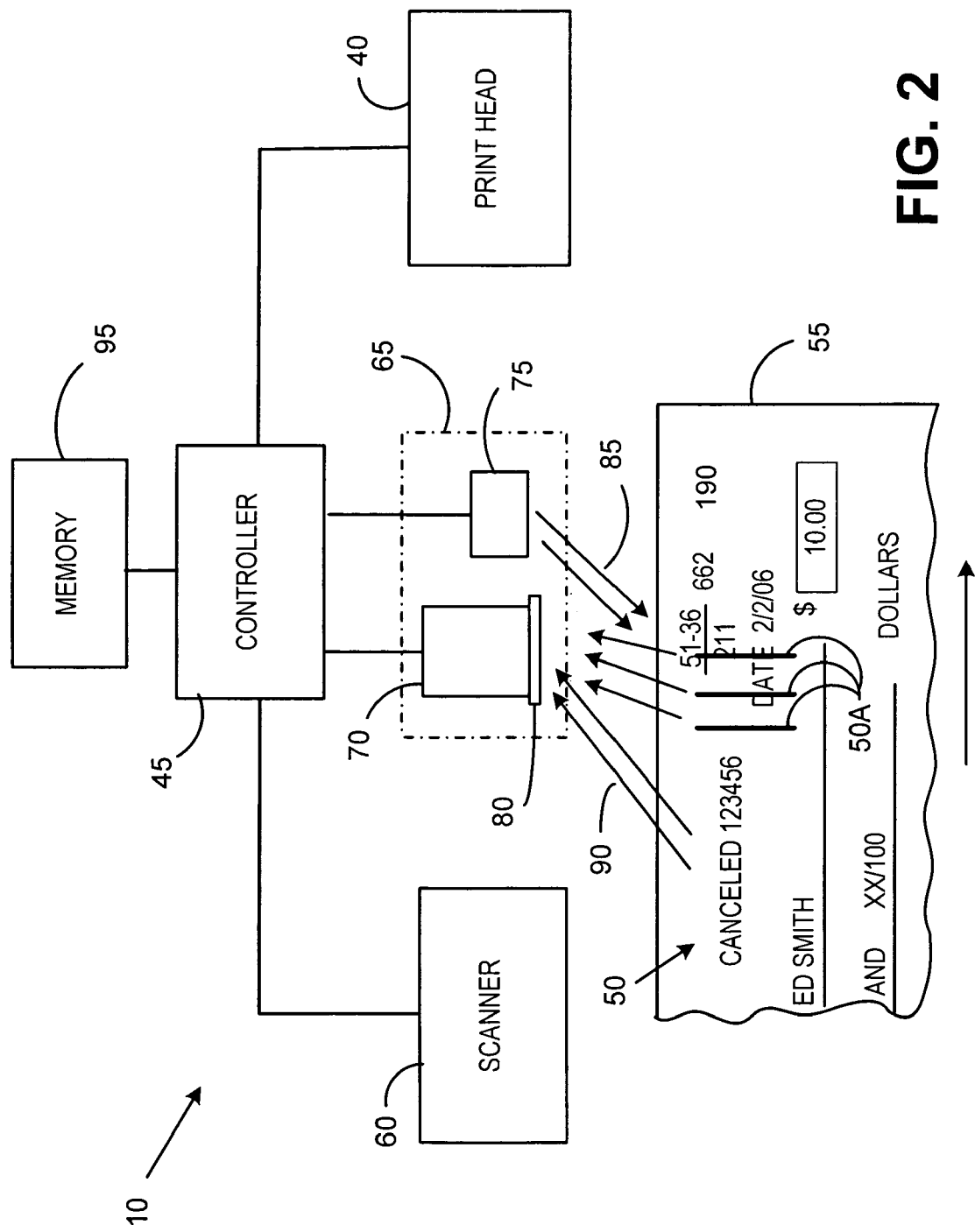
FIG. 2 is a schematic diagram of one embodiment of a check scanning device according to an aspect of the invention that may be employed in the remote check capture system shown in FIG. 1.

FIG. 2 is a schematic diagram of one embodiment of the check scanning device 10 according to an aspect of the invention. The check scanning device 10 includes a print head 40, such as, for example, an ink jet print head, that is connected to and under the control of a controller 45, such as, for example, a microprocessor or microcontroller. The print head 40 is adapted to print information 50 onto a check 55 that is fed into the check scanning device 40 that indicates, as described in further detail herein, that the check 55 has been canceled. As used herein, the term canceled means that the check 55 in question has been scanned and submitted for electronic deposit using the check scanning device 10 or a similar device. The information 50 preferably includes some type of cancellation marking, such as the word "CANCELED" or any other desired word, symbol, or combination thereof. In addition, each check that is processed may be assigned a unique identifier that is used to track the check while working its way through the remote check capture system 5, and that identifier may be provided as part of the cancellation marking. Furthermore, as described further herein, the information 50 includes one or more indicating marks 50A which indicate the number of times that the check 55 has been submitted for processing by the check scanning device 10. The check scanning device 10 further includes a scanner 60 that is connected to and under the control of the controller 45 for generating an electronic image of the check 55. A transport mechanism (not shown) for transporting the check 55 within the check scanning device 10 is also provided.

In the preferred embodiment, the print head 40 is adapted to print the information 50, including the indicating marks 50A, with a luminescent ink, such as a fluorescent ink or a phosphorescent ink, using an ink jet printing method. Color fluorescent inks are known and are described in, for example, U.S. patent application publication nos. US 2002/0195586 A1, US 2003/0005303 A1, and US 2004/0041774

A1, the disclosures of which are incorporated herein by reference. The color fluorescent ink could be any suitable color including, for example, red or blue. Invisible luminescent ink jet inks may also be used and are described in U.S. Pat. No. 6,905,538, the disclosure of which is incorporated herein by reference. Such inks have been used to by government postal services, such as the USPS, to validate that a postage indicium is authentic. Such inks have also been used to place a mark on a postage indicium provided on a mailpiece to indicate that the postage value has been used. A system for detecting such a mark, which is similar to the detection system disclosed herein, is described in U.S. patent application publication no. US 2006/0044341 A1, the disclosure of which is incorporated herein by reference.

Referring again to FIG. 2, the check scanning device 10 also includes a luminescent ink sensor 65 located downstream from the print head 40. The function of the luminescent ink sensor 65 is to sense the information 50, including any indicating marks 50A, that is present on the check 55 as it passes thereby during the course of the method described below and shown in FIG. 4. The luminescent ink sensor 65 is in electronic communication with and under the control of the controller 45 and includes a photodetector 70, a radiant energy source 75, and a filter 80. Any suitable photodetector device may be used for the photodetector 70, which generally comprises a light-to-voltage sensor. The radiant energy source 75 may generally comprise an ultraviolet (UV) light emitting diode (LED), although any suitable radiant energy source may also be used. The filter 80 is a wavelength filter, such as a high pass filter. Any suitable filter could be provided, such as a physical filter or a coating provided on an optical lens. The filter 80 is located between the path of travel of the check 55 and the photodetector 70.

The check scanning device 10 also includes a memory 95, which is coupled to or a part of the controller 45. The memory 95 may be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. The memory 95 stores routines that are executable by the controller 45 and that implement the functionality of the check scanning device 10 according to the various embodiments of the present invention as described herein.

Figure 3:
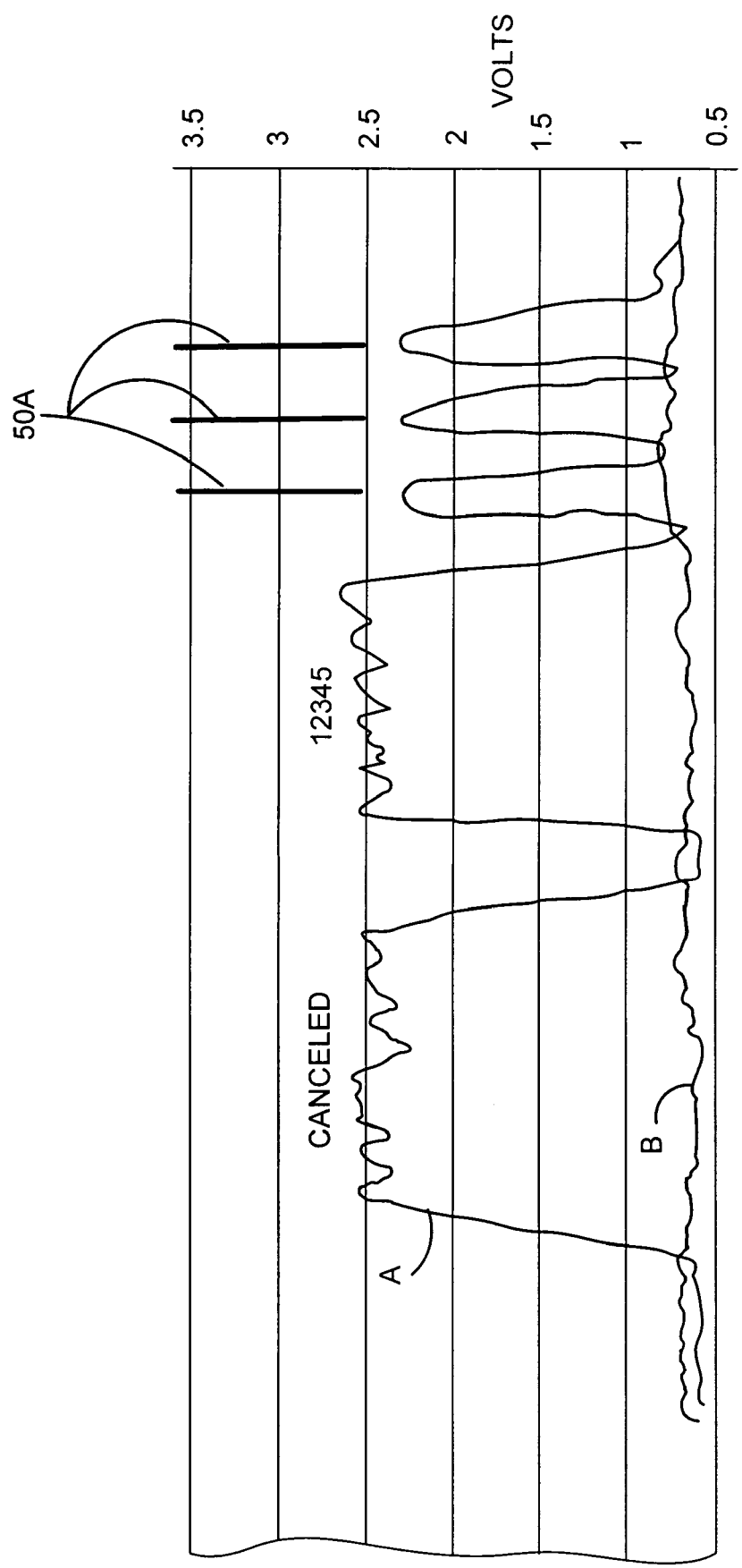
FIG. 3 depicts a sample output voltage profile that may be generated by the sensor device forming a part of the check scanning device shown in FIG. 2.

In operation, the radiant energy source 75 emits radiant energy 85 of a particular wavelength. The information 50, being printed with a luminescent ink, will transform the radiant energy 85 into a light signal 90 having a particular wavelength depending on the nature of the luminescent ink and the wavelength of the radiant energy 85. The light signal 90 will pass through the filter 80 and the resulting filtered signal will be absorbed by the photodetector 70, which converts it to an output voltage that is provided to the controller 45. As will be appreciated, with a given type of ink, the expected output voltage will be known. In addition, the nature of the waveform or profile of the output voltage will depend upon and correspond to the words or symbols included in the information 50, including any indicating marks 50A that are present. As a result, known words, symbols or shapes will generate relatively consistent, expected profiles. For example, the word "CANCELED" followed by a series of vertical bars (one possible form of the indicating marks 50A) will, in response to the radiant energy 85, produce a particular light signal 90 which will result in an output voltage profile having a particular, generally consistent shape. That output voltage profile may, for example, take the shape of the profile A shown in FIG. 3, which is depicted along with a baseline (from the check stock) profile B.

Thus, the luminescent ink sensor 65 as just described may be used to detect whether the information 50 is in fact present on the check 55, and, with further processing by the controller 45, the number of indicating marks, if any, that are present (the importance of the number of indicating marks 50A will become apparent below). In particular, if, in response to the radiant energy 85, an appropriate voltage profile (i.e., a profile having a particular shape and amplitude characteristics) is not generated by the photodetector 70, then that is an indication that the information 50 is not present on the check 55. Conversely, if, in response to the radiant energy 85, an appropriate voltage profile is generated by the photodetector 70 (in response to the light signal 90), then that is an indication that the information 50 is present on the check 55. In addition, a certain profile will be expected for each indicating mark 50A, and thus the number of such profiles that are present and detected will indicate the number of indicating marks 50A that are present.

In one particular embodiment, the radiant energy source 75 is an ultraviolet (UV) LED that provides 410 nm light energy as the radiant energy 85, and the luminescent ink used to print the information 50 is a fluorescent ink that transforms 410 nm light into 600 nm orange light. In this embodiment, the filter 80 is a 550 nm or 600 nm high pass filter, and thus will only pass light having that wavelength or higher and will absorb lower wavelength light. In this way, the luminescent ink sensor 65 is adapted to detect 600 nm light. This is advantageous since many types of check stock include fluorescent fibers, and the filter 80 will prevent light from those fluorescent fibers from being absorbed by the photodetector 65.

As noted in the Background, under certain circumstances, such as a problem encountered during scanning or during processing at the server 25, it may be necessary for a check that was previously scanned using the check scanning device 10, printed with the information 50 and submitted to the server 25 to be legitimately re-scanned and resubmitted. As will be appreciated, it such as case, it is not necessary or desirable to have the information 50 reprinted on the check when it is re-scanned and resubmitted. Thus, an aspect of the invention, described below, includes a mechanism for preventing the reprinting of the information 50 for checks being resubmitted. Moreover, according to an aspect of the invention, each time that a check is submitted (including resubmissions) for processing by the check scanning device 10, an indicating mark 50A is printed in the check. The invention, in this aspect, is thus able to limit the number of times that a check may be resubmitted by counting the indicating marks 50A that are present on the check and not permitting further processing if and when the number of indicating marks 50A reaches a certain predetermined number.

Figure 4:
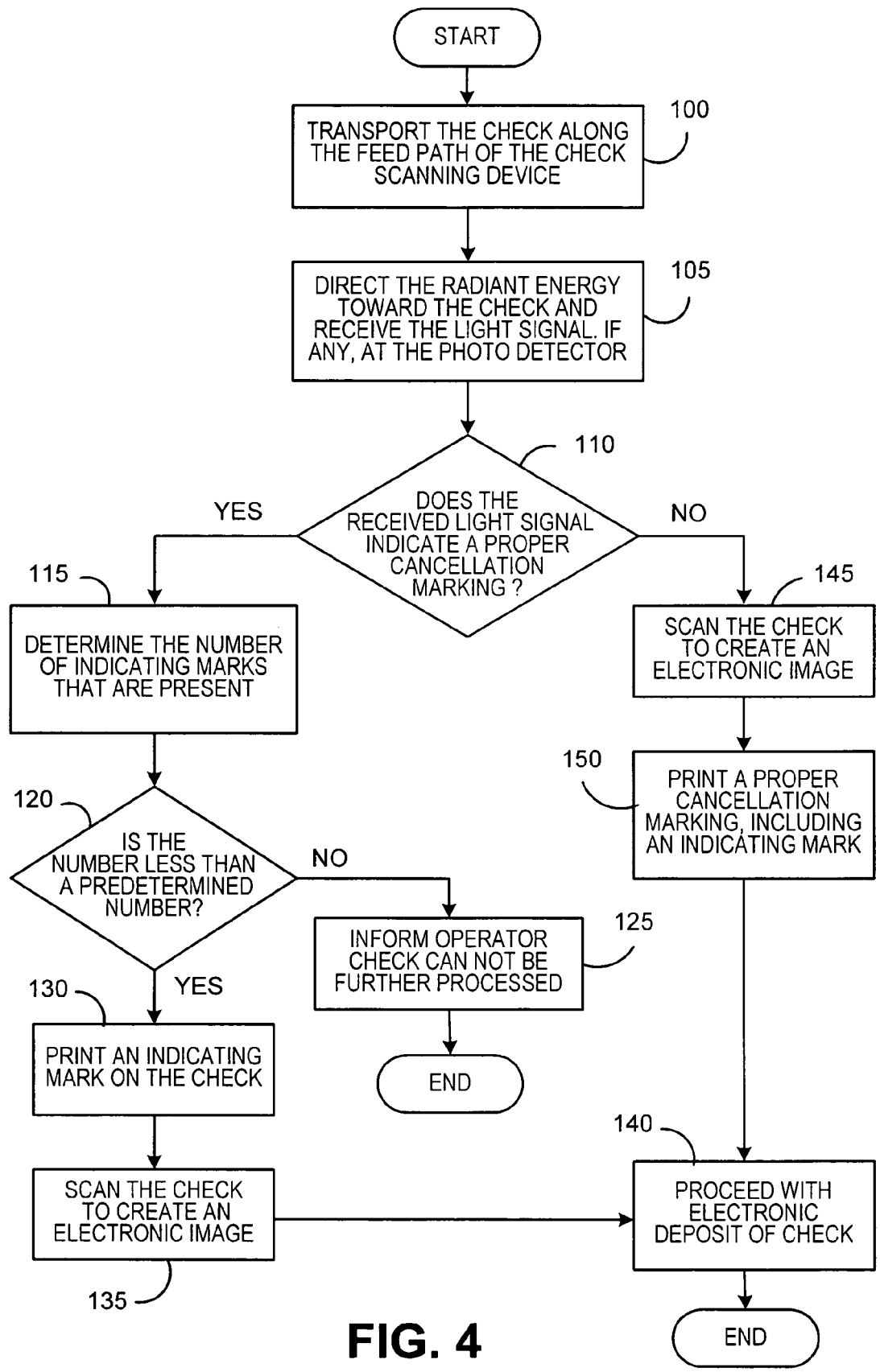
FIG. 4 is a flowchart that illustrates one embodiment of a method of operation of the check scanning device shown in FIG. 2.

FIG. 4 is a flowchart that illustrates a method of operation of the check scanning device 10 according to one embodiment of the invention. The method begins at step 100, where, after an operator of the check scanning device 10 has fed a check 55 to be deposited into the check scanning device 10, the check 55 is transported along the feed path of the check scanning device 10 to a location adjacent to the luminescent ink sensor 65. Next, at step 105, the radiant energy 85 is directed toward the check 55, and the light signal 90, if any, is received at the photodetector 70. At step 110, a determination is made as to whether the received light signal 90, if any, indicates a proper cancellation marking, such as the information 50 including one or more indicating marks 50A described above. If the answer at step 110 is yes, then, at step 115, the number of indicating marks 50A that are present in the information 50 is determined. Specifically, the controller 45 will analyze the voltage profile output of the senor device 65 to determine the number of indicating marks 50A that are indicated by the profile. Next, at step 120, a determination is made as to whether the number of indicating marks 50A is less than a pre-set limit, such as three. As will be appreciated, the pre-set limit is equal to the maximum number of times that a check may be resubmitted for processing by the check scanning device. If the answer is no, meaning that the number of indicating marks 50A is equal to the pre-set limit, then, at step 125, the operator is informed that the check 55 has already been submitted the maximum number of allowable times and cannot be further processed. Following step 125, the method ends. If, however, the answer at step 120 is yes, meaning that the pre-set limit has not yet been reached and that the check may be resubmitted for processing, then, at step 130 an indicating mark 50A is printed on the check 55 in the appropriate place using a luminescent ink. The indicating marks 50A may take any number of suitable forms, such as the vertical, spaced lines or bars having a predetermined width shown in FIGS. 2 and 3. In one embodiment, the vertical lines or bars forming the indicating marks 50A have a width of about 1 mm and are spaced about 5 mm apart from one another. Next, at step 135, the check 55 is transported to the scanner 60 and an electronic image of the check 55 is created. Following step 135, the method proceeds to step 140, where the check 55 is allowed to proceed through the remainder check deposit process. For such a check (i.e., a check being resubmitted), steps will preferably be taken to ensure that it is only actually deposited once. For example, as noted elsewhere herein, the server 25 accumulates information for the checks being remotely deposited. In the case of re-submitted checks, that server 25 may replace any existing data is has accumulated for the check when it was previously submitted with the data accompanying the re-submitted version of the check. In the preferred embodiment, the unique identifier assigned to the check in question is used to facilitate this process, i.e., it is used to identify the relevant data at the server 25. Alternatively, the resubmitted check may be transmitted to the server with some type of data indicating that it is being resubmitted for deposit so that the server 25 can take the appropriate action.

Returning to step 110, if the answer is no, meaning no cancellation marking is present, then, at step 145, the check 55 is transported to the scanner 60 and an electronic image of the check 55 is generated. Next, at step 150, the check 55 is transported to the print head 40 and a print operation is initiated to properly print a designated cancellation marking, such as the information 50, onto the check 55 using a luminescent ink. As described above, the cancellation marking may consist of the word "CANCELED" or any other desired word, symbol, or combination thereof, and may include a unique identifier for tracking purposes. In addition, according to the preferred embodiment, an indicating mark 50A, such as a vertical bar described above, is printed in luminescent ink as part of the cancellation marking 50. This first indicating mark 50A will signify that the check has been submitted for processing one time. Subsequent indicating marks 50A that are printed at step 130 will indicate each of the one or more additional times that the check 55 is submitted for processing. Following step 150, the method proceeds to step 140, where, as described above, the check 55 is allowed to proceed through the remainder check deposit process.

Thus, the present invention provides a method and apparatus for monitoring the number of times that a particular check 55 has been submitted for electronic deposit using the check scanning device 10 and the remote check capture system 5 so that the number of submission attempts for the check 55 can be limited to reduce the potential for fraud and abuse.

In an alternative embodiment, the process of FIG. 4 may be modified. In one described embodiment of the process flow of the system, the check is printed and then scanned. In an alternative embodiment, it may be advantageous to scan and then print. For example, steps 130 and 135 may be interchanged in their order so that step 135 is processed before step 130. In addition to being useful for resubmitted images, it may be useful to send an unaltered digital image to the receiving bank in its normal operation.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. For example, while the embodiments described above utilize a luminescent ink (e.g., fluorescent or phosphorescent ink) to create the cancellation mark and indicating marks 50A, it should be appreciated that other types of energy emitting ink or even non-energy emitting inks may also be used. As used herein, energy emitting ink means an ink that will emit a particular type of energy when a first energy impinges upon it. Such inks may include, without limitation, fluorescent, phosphorescent and magnetic inks or an ink having RF elements dispersed therein (RFID ink). Moreover, in the case of non-energy emitting inks, the sensor device 65 may be an image generating device wherein optical character recognition or similar processes are used to determine the contents of the surface of a check (e.g., the presence of indicating marks 50A) from an image of the check that is generated. Accordingly, the invention is not to be considered as limited by the foregoing description but is only limited by the scope of the appended claims.

What is claimed is:

1. A method of processing a check prior to electronically depositing the check, comprising:
    (a) receiving said check;
    (b) determining a number of existing check submission indicating marks that are present on said check;
    (c) determining whether said number is less than a pre-set maximum number;
    (d) discontinuing the processing of said check if it is determined that said number is not less than said pre-set maximum number; and
    (e) printing a new check submission indicating mark onto said check and continuing the processing of said check if it is determined that said number is less than said pre-set maximum number,
    wherein said existing check submission indicating marks, if any, are printed with an energy emitting ink,
    wherein said step of determining a number of existing check submission indicating marks comprises
        (i) radiating first energy toward said check,
        (ii) receiving second energy, if any, emitted from said check as a result of said radiated first energy impinging upon said existing check submission indicating marks, if any, present on said check, said second energy, if any, indicating the presence of one or more existing check submission indicating marks, and (iii) determining said number based upon said second energy or lack thereof, and wherein said printing step comprises printing the new check submission indicating mark with said energy emitting ink.

2. The method according to claim 1, wherein said energy emitting ink is a luminescent ink.

3. The method according to claim 2, wherein said first energy is UV energy.

4. The method according to claim 1, further comprising informing an operator that the processing of said check cannot continue if it is determined that said number is not less than said pre-set maximum number.

5. The method according to claim 1, further comprising determining whether a proper cancellation marking is present on said check prior to said step of determining a number of existing check submission indicating marks, and printing a proper cancellation marking onto said check if it is determined that a proper cancellation marking is not present on said check.

6. A method of processing a check prior to electronically depositing the check, comprising:
   (a) receiving said check;
   (b) determining a number of existing check submission indicating marks that are present on said check;
   (c) determining whether said number is less than a pre-set maximum number;
   (d) discontinuing the processing of said check if it is determined that said number is not less than said pre-set maximum number; and
   (e) printing a new check submission indicating mark onto said check and continuing the processing of said check if it is determined that said number is less than said pre-set maximum number,
   further comprising determining whether a proper cancellation marking is present on said check prior to said step of determining a number of existing check submission indicating marks, and printing a proper cancellation marking onto said check if it is determined that a proper cancellation marking is not present on said check,
   wherein steps (b) through (e) are performed only if it is determined that a proper cancellation marking is present on said check.

7. The method according to claim 6, wherein the proper cancellation marking that is printed onto said check includes a first check submission indicating mark.

8. The method according to claim 6, wherein the proper cancellation marking that is printed onto said check does not include a check submission indicating mark.

9. A method of processing a check prior to electronically depositing the check, comprising:
   (a) receiving said check;
   (b) determining a number of existing check submission indicating marks that are present on said check;
   (c) determining whether said number is less than a pre-set maximum number;
   (d) discontinuing the processing of said check if it is determined that said number is not less than said pre-set maximum number; and
   (e) printing a new check submission indicating mark onto said check and continuing the processing of said check if it is determined that said number is less than said pre-set maximum number,
   further comprising determining whether a proper cancellation marking is present on said check prior to said step of determining a number of existing check submission indicating marks, and printing a proper cancellation marking onto said check if it is determined that a proper cancellation marking is not present on said check,
   wherein said step of printing a proper cancellation marking onto said check comprises printing the proper cancellation marking using an energy emitting ink.

10. The method according to claim 9, further comprising scanning said check to create an electronic image of said check.

11. A method of processing a check prior to electronically depositing the check, comprising:
    (a) receiving said check;
    (b) determining a number of existing check submission indicating marks that are present on said check;
    (c) determining whether said number is less than a pre-set maximum number;
    (d) discontinuing the processing of said check if it is determined that said number is not less than said pre-set maximum number; and
    (e) printing a new check submission indicating mark onto said check and continuing the processing of said check if it is determined that said number is less than said pre-set maximum number,
    wherein said existing check submission indicating marks, if any, and said new check submission indicating mark each comprise a vertically oriented bar.

12. An apparatus for electronically depositing a check, comprising:
    a controller;
    a scanner in electronic communication with said controller for generating an electronic image of said check;
    a print head in electronic communication with said controller;
    a sensor device in electronic communication with said controller; and
    a memory in electronic communication with said controller, said memory having one or more routines executable by said controller, said one or more routines including instructions for:
    (a) causing the sensor device to obtain a signal from a surface of said check;
    (b) determining a number of existing check submission indicating marks that are present on said surface of said check based upon said signal;
    (c) determining whether said number is less than a pre-set maximum number;
    (d) discontinuing the processing of said check if it is determined that said number is not less than said pre-set maximum number; and
    (e) causing said print head to print a new check submission indicating mark onto said check and continuing the processing of said check if it is determined that said number is less than said pre-set maximum number,
    wherein said existing check submission indicating marks, if any, are printed with an energy emitting ink,
    wherein said sensor device includes a radiant energy source for radiating first energy,
    wherein said instructions for causing the sensor device to obtain a signal from a surface of said check comprise instructions for causing said radiant energy source to radiate said first energy toward said check,
    wherein said signal comprises second energy, if any, received by said sensor device that is emitted from said check as a result of said radiated first energy impinging upon said existing check submission indicating marks, if any, present on said check, said second energy, if any, indicating the presence of one or more existing check submission indicating marks, wherein said instructions for determining a number of existing check submission indicating marks comprise instructions for determining said number based upon said second energy or lack thereof, and wherein said instructions for printing comprise instructions for printing the new check submission indicating mark with said energy emitting ink.

13. The apparatus according to claim 12, wherein said energy emitting ink is a luminescent ink, wherein said radiant energy source comprises a UV LED, and wherein said first energy is UV energy.

14. The apparatus according to claim 13, wherein said sensor device includes a photodetector for converting said second energy, if any, into a voltage profile and wherein the instructions for determining said number based upon said second energy or lack thereof is based on said voltage profile.

15. The apparatus according to claim 12, wherein said instruction further comprise instructions for informing an operator of said apparatus that the processing of said check cannot continue if it is determined that said number is not less than said pre-set maximum number.

16. The apparatus according to claim 12, further comprising instructions for determining whether a proper cancellation marking is present on said check based upon said signal prior to instructions (b) being performed, and instructions for causing said print head to print a proper cancellation marking onto said check if it is determined that a proper cancellation marking is not present on said check.

17. An apparatus for electronically depositing a check, comprising:
   a controller;
   a scanner in electronic communication with said controller for generating an electronic image of said check;
   a print head in electronic communication with said controller;
   a sensor device in electronic communication with said controller; and
   a memory in electronic communication with said controller, said memory having one or more routines executable by said controller, said one or more routines including instructions for:
   (a) causing the sensor device to obtain a signal from a surface of said check;
   (b) determining a number of existing check submission indicating marks that are present on said surface of said check based upon said signal;
   (c) determining whether said number is less than a pre-set maximum number;
   (d) discontinuing the processing of said check if it is determined that said number is not less than said pre-set maximum number; and
   (e) causing said print head to print a new check submission indicating mark onto said check and continuing the processing of said check if it is determined that said number is less than said pre-set maximum number;
   further comprising instructions for determining whether a proper cancellation marking is present on said check based upon said signal prior to instructions (b) being performed, and instructions for causing said print head to print a proper cancellation marking onto said check if it is determined that a proper cancellation marking is not present on said check,
   wherein instructions (b) through (e) are performed only if it is determined that a proper cancellation marking is present on said check.

18. The apparatus according to claim 17, wherein the proper cancellation marking that is printed onto said check includes a first check submission indicating mark.

19. The apparatus according to claim 17, wherein the proper cancellation marking that is printed onto said check does not include a check submission indicating mark.

20. The apparatus according to claim 17, wherein said proper cancellation marking is printed with an energy emitting ink.

21. An apparatus for electronically depositing a check, comprising:
   a controller;
   a scanner in electronic communication with said controller for generating an electronic image of said check;
   a print head in electronic communication with said controller;
   a sensor device in electronic communication with said controller; and
   a memory in electronic communication with said controller, said memory having one or more routines executable by said controller, said one or more routines including instructions for:
   (a) causing the sensor device to obtain a signal from a surface of said check;
   (b) determining a number of existing check submission indicating marks that are present on said surface of said check based upon said signal;
   (c) determining whether said number is less than a pre-set maximum number;
   (d) discontinuing the processing of said check if it is determined that said number is not less than said pre-set maximum number; and
   (e) causing said print head to print a new check submission indicating mark onto said check and continuing the processing of said check if it is determined that said number is less than said pre-set maximum number,
   wherein said existing check submission indicating marks, if any, and said new check submission indicating mark each comprise a vertically oriented bar.

* * * * *